(12) United States Patent
Schenk (10) Patent No.: US 8,094,546 B2
(45) Date of Patent: Jan. 10, 2012

(54) DEVICE AND METHOD FOR COMPENSATING CROSSTALK IN TRANSMISSION LINKS

(75) Inventor: Heinrich Schenk, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 420 days.

(21) Appl. No.: 11/762,653

(22) Filed: Jun. 13, 2007

(65) Prior Publication Data

US 2008/0310520 A1  Dec. 18, 2008

(51) Int. Cl.
    *H04J 1/12* (2006.01)
(52) U.S. Cl. .......... 370/201; 370/252; 324/628
(58) Field of Classification Search .......... 375/224; 379/417; 370/201, 252; 324/628
    See application file for complete search history.

(56) References Cited

U.S. PATENT DOCUMENTS

| | | | |
|---|---|---|---|
| 6,922,448 B1* | 7/2005 | Jacobsen et al. | 375/295 |
| 7,046,751 B1* | 5/2006 | Kantschuk et al. | 375/346 |
| 7,076,168 B1* | 7/2006 | Shattil | 398/76 |
| 7,177,284 B2 | 2/2007 | Peleg et al. | |
| 7,263,193 B2* | 8/2007 | Abel | 381/1 |
| 2001/0019538 A1 | 9/2001 | Mizutani et al. | |
| 2002/0188668 A1 | 12/2002 | Jeffery et al. | |
| 2003/0058803 A1 | 3/2003 | Casper | |
| 2003/0099350 A1* | 5/2003 | Bostoen et al. | 379/417 |
| 2003/0137925 A1 | 7/2003 | Zamir | |
| 2003/0165114 A1 | 9/2003 | Kusama et al. | |
| 2004/0047283 A1 | 3/2004 | Bonwick et al. | |
| 2005/0078666 A1 | 4/2005 | Beshai | |
| 2006/0062287 A1* | 3/2006 | Van Bruyssel | 375/222 |
| 2006/0153106 A1* | 7/2006 | Laakso et al. | 370/282 |
| 2007/0121706 A1 | 5/2007 | Nakamura et al. | |
| 2007/0121715 A1* | 5/2007 | Shi | 375/224 |
| 2007/0263711 A1* | 11/2007 | Kramer et al. | 375/222 |
| 2007/0268811 A1* | 11/2007 | Clausen | 370/201 |
| 2008/0031313 A1* | 2/2008 | Oksman | 375/222 |
| 2008/0068978 A1 | 3/2008 | Clausen | |
| 2008/0182531 A1 | 7/2008 | Lagnado et al. | |
| 2010/0208785 A1* | 8/2010 | Lindqvist et al. | 375/227 |

OTHER PUBLICATIONS

Holte, Nils, "Potential performance of partial crosstalk cancellation in twisted pair cables", 2006, IEEE Globecom 2006.*
Homer, John et al., "Adaptive NLMS Partial Crosstalk Cancellation in Digital Subscriber Lines", 2006, Fortieth Asilomar Converence on Signals, Systems and Computers, pp. 1385-1389.*
R. Cendrillon, et al., "Low Complexity Crosstalk Cancellation through Line Selection in Upstream VDSL", Jun. 5, 2003, 2003 IEEE International Conference on Acoustics, Speach, and Signal Processing, IV- 692-695 vol. 4.*
Bagheri, H., et al., "Iterative Joint Power Control and Partial Crosstalk Cancellation in Upstream VDSL," Transactions on Engineering; Computing and Technology V2, ISSN 1305-5313, Dec. 2004, pp. 31-34.

(Continued)

*Primary Examiner* — Jason Mattis
(74) *Attorney, Agent, or Firm* — Slater & Matsil, L.L.P.

(57) ABSTRACT

In an embodiment, a method of compensating crosstalk on a plurality of transmission links is disclosed. The method includes providing first values depending on crosstalk among a plurality of transmission links. Each first value corresponds to one of a plurality of crosstalk channels, and each crosstalk channel represents signal transfer from one of the plurality of the transmission links to a different one of the plurality of transmission links. Second values specific to the transmission links are provided. A number of crosstalk channels are selected from a plurality of crosstalk channels interfering with signal transmission on transmissions links. The selecting depends on quotients of the first values and the second values.

29 Claims, 7 Drawing Sheets

OTHER PUBLICATIONS

Cendrillon, R., et al., "Partial Crosstalk Cancellation for Upstream VDSL," EURASIP Journal of Applied Signal Processing, 2004, pp. 1520-1535.

"Transmission and Multiplexing™; Access transmission systems on metallic access cables; Very high speed Digital Subscriber Line (VDSL); Part 1: Functional requirements," Technical Specification, Jul. 2003, pp. 1-82, ETSI TS 101 270-1, V1.3.1.

"Second Letter Ballot Draft of the DSM Technical Report," Editor DSM Technical Report, Feb. 12-15, 2007, 97 pages, NIPP-NAI-2006-188, Nashville, TN.

* cited by examiner

DEVICE AND METHOD FOR COMPENSATING CROSSTALK IN TRANSMISSION LINKS

TECHNICAL FIELD

An embodiment of the invention relates to transmission links and in particular embodiments to hard-wired transmission lines.

BACKGROUND

Telecommunication and broadband services are usually provided to customer premises via twisted pairs of wires. The twisted pairs are often grouped in close proximity into binder groups. Data transmission in these settings may suffer from interference arising from electromagnetic coupling between neighboring twisted pairs, referred to as crosstalk interference.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

In the following embodiments of the invention are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in block diagram form in order to facilitate describing one or more aspects of the embodiments of the invention. The following description is therefore not to be taken in a limiting sense, and the scope of the invention is defined by the appended claims.

Figure 1:
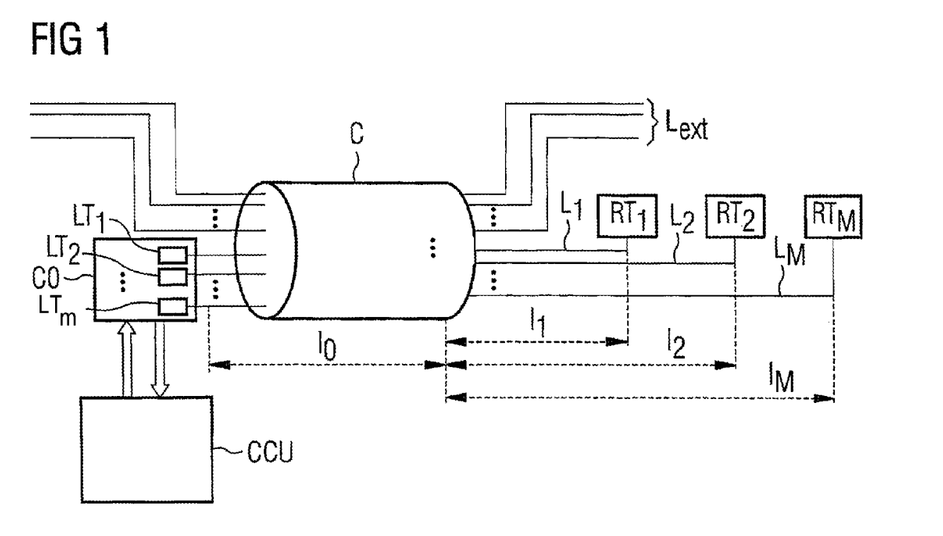
FIG. 1 schematically illustrates a network of a plurality of transmission lines $L_1$ to $L_M$.

Referring to FIG. 1, a schematic diagram of a network of a plurality of transmission lines $L_1$ to $L_M$ is shown. The transmission lines $L_1$ to $L_M$ are bundled together within a cable C over a length $l_0$. The network has a central office CO containing a plurality of transceivers $LT_1$ to $LT_M$ coupled to the respective ends of the transmission lines $L_1$ to $L_M$. At the subscriber premises transceivers $RT_1$ to $RT_M$ are coupled to the other respective ends of the transmission lines $L_1$ to $L_M$. The transceivers $RT_1$ to $RT_M$ may, for example, be modems. Data transmission from the central office CO to a subscriber is called downstream data transmission, whereas data transmission from a subscriber to the central office CO is called upstream data transmission.

While the transmission lines $L_1$ to $L_M$ may have all the same length, it is to be noted that they may also have different lengths. In the network shown in FIG. 1 the length of a transmission line $L_i$ is the sum of the length $l_0$ and a length $l_i$ (i=1, ... M). The length $l_0$ is the length over which the transmission lines $L_1$ to $L_M$ are bundled together and occupy the same cable C. The length $l_i$ is the length from the end of the cable C to the transceiver $RT_i$. Each of the transmission lines $L_1$ to $L_M$ may, for example, be a pair of twisted wires.

Furthermore, it is to be noted that the cable C may comprise transmission lines $L_{ext}$, which are not coupled to the central office CO.

The transmission lines $L_1$ to $L_M$ may form a telecommunication channel. Since voice telephony uses only a small fraction of the bandwidth usually available on the transmission lines $L_1$ to $L_M$, the remaining fraction of the available bandwidth may be used for transmitting data. For data transmission there are a number of services available, such as ISDN (Integrated Services Digital Network) or ADSL (Asymmetric Digital Subscriber Line) or VDSL (Very high bit-rate Digital Subscriber Line) or VDSL2 (Very high bit-rate Digital Subscriber Line 2) or other services.

In systems such as the system shown in FIG. 1, due to the proximity of the transmission lines $L_1$ to $L_M$ within the cable C of the length $l_0$, crosstalk interference between different neighboring transmission lines $L_1$ to $L_M$ exists. Depending on the location where the crosstalk is introduced, two types of interference are distinguished which are explained in the following: near-end crosstalk (NEXT) and far-end crosstalk (FEXT).

NEXT refers to interference between neighboring transmission lines $L_1$ to $L_M$ that arises when signals are transmitted in opposite directions. If the neighboring transmission lines $L_1$ to $L_M$ carry the same type of service, then the interference is called self-NEXT.

FEXT refers to interference between neighboring transmission lines $L_1$ to $L_M$ that arises when signals are transmitted in the same direction. If the neighboring transmission lines $L_1$ to $L_M$ carry the same type of service, such as VDSL, then the interference is called self-FEXT.

Furthermore, noise can be coupled to the transmission lines $L_1$ to $L_M$ that is generated by other sources than neighboring transmission lines $L_1$ to $L_M$. This noise is called alien noise and may, for example, be generated by the transmission lines $L_{ext}$.

If different frequency bands are used for downstream data transmission and upstream data transmission which is, for example, the case in VDSL, NEXT does not affect the transmission quality. However, FEXT causes more serious problems.

The frequency band used for transmitting signals in downstream direction may be different from the frequency band used for transmitting signals in upstream direction. As a consequence, self-NEXT can be excluded as a source of interference in this case, however self-FEXT must be considered.

Figure 2:
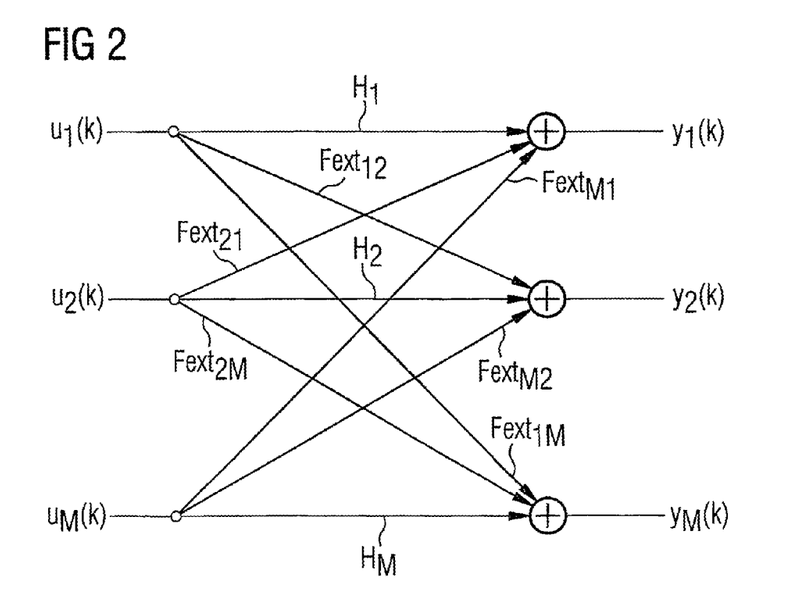
FIG. 2 illustrates an interference channel model showing crosstalk interference among the transmission lines $L_1$ to $L_M$.

In FIG. 2 an interference channel model is illustrated exhibiting crosstalk interference among the transmission lines $L_1$ to $L_M$ in either downstream or upstream direction. A signal $u_i(k)$ is provided to the input terminal of a transmission line $L_i$ and a signal $y_i(k)$ is received at the output terminal of the transmission line $L_i$ (i=1, ... M). Transfer functions $H_1$ to $H_M$ are the transfer functions of the transmission lines $L_1$ to $L_M$, respectively. In particular, each transfer function $H_i$ depends on the attenuation along the corresponding transmission line $L_i$. Transfer functions $Fext_{11}$, $Fext_{12}$, $Fext_{21}$, ..., $Fext_{(M-1)M}$, $Fext_{M(M-1)}$ are crosstalk transfer functions, wherein the crosstalk transfer function $Fext_{ji}$ is the transfer function of the crosstalk channel from the input terminal of the transmission line $L_j$ to the output terminal of the transmission line $L_i$ for a specific frequency channel k (j, i=1, ..., M). In the following, the term $Fext_{ji}$ is not only associated with the crosstalk transfer function from the input terminal of the transmission line $L_j$ to the output terminal of the transmission line $L_i$, but also with the corresponding crosstalk channel. Alien noise is not considered in the interference channel model shown in FIG. 2.

In upstream data transmission the receiving modems, which are the transceivers $LT_1$ to $LT_M$, are co-located at the central office CO. This allows joint reception of the signals transmitted over the transmission lines $L_1$ to $L_M$, thereby enabling crosstalk cancellation.

In downstream data transmission the receiving modems, which are the transceivers $RT_1$ to $RT_M$, reside within different customer premises so that crosstalk cancellation is not possible. However, since in downstream data transmission the transmitting modems, which are the transceivers $LT_1$ to $LT_M$, are co-located at the central office CO, it is possible to employ crosstalk precompensation. In crosstalk precompensation the signal to be transmitted is pre-distorted such that the pre-distortion compensates the crosstalk introduced by the transmission channel.

If the frequency band used for transmitting signals in downstream direction is different from the frequency band used for transmitting signals in upstream direction, self-NEXT can be excluded as a source of interference, however self-FEXT must be considered. For example, VDSL may be used as services for transmitting data over the transmission lines and DMT (discrete multi-tone) modulation may be used for modulating signals, however the embodiment described in the following is not limited thereto. While the following description is provided with respect to systems using different frequency bands for transmitting in downstream and upstream direction, it is to be noted that according to other embodiments a system may use the same frequency band, but different time slots for downstream and upstream directions.

Figure 3:
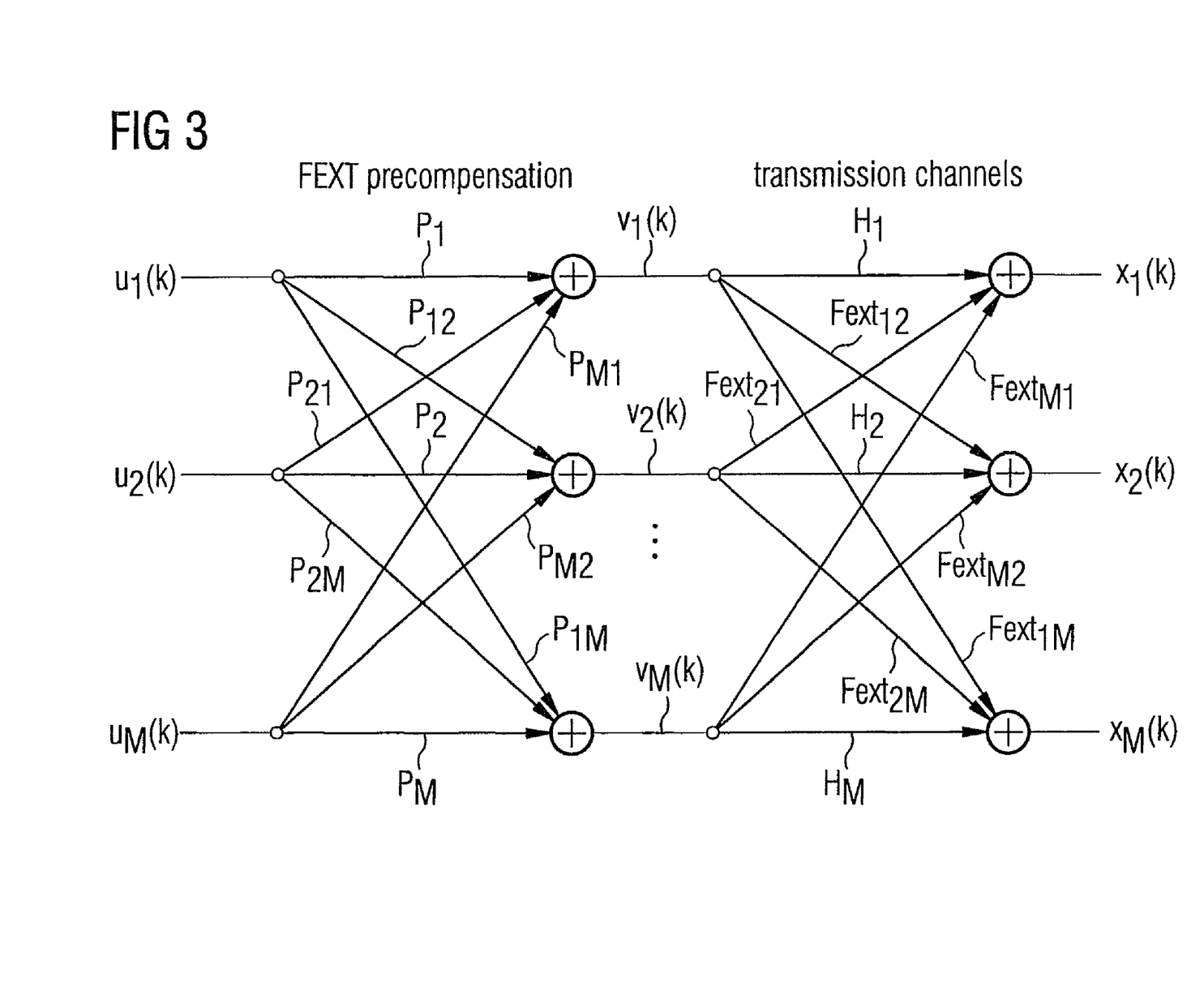
FIG. 3 illustrates a model of FEXT precompensation in downstream data transmission.

Since DMT transmission is employed and interconnections between different frequency channels do not occur, it is possible to model crosstalk independently on each frequency (or tone). In the following the frequency channels are denoted by the index k. For precompensating self-FEXT in downstream data transmission, the signals $u_1(k)$ to $u_M(k)$ to be transmitted are listed in a vector u. The vector u is multiplied by a precompensation matrix P, in which the main diagonal entries are the precompensation values $P_i$ and the entries outside of the main diagonal are the precompensation values $P_{ji}$ as shown on the left hand side of FIG. 3. This multiplication results in a vector v containing precompensated signals $v_1(k)$ to $v_M(k)$. The precompensated signals $v_1(k)$ to $v_M(k)$ are emitted from the transceivers $LT_1$ to $LT_M$, respectively. During transmission over the transmission lines $L_1$ to $L_M$, the signals $v_1(k)$ to $v_M(k)$ experience crosstalk interference. On the right hand side of FIG. 3, the interference channel model that was already shown in FIG. 2 is illustrated exhibiting crosstalk interference among the transmission lines $L_1$ to $L_M$. At the output terminals of the transmission lines $L_1$ to $L_M$ signals $x_1(k)$ to $x_M(k)$ are received, respectively.

Figure 4:
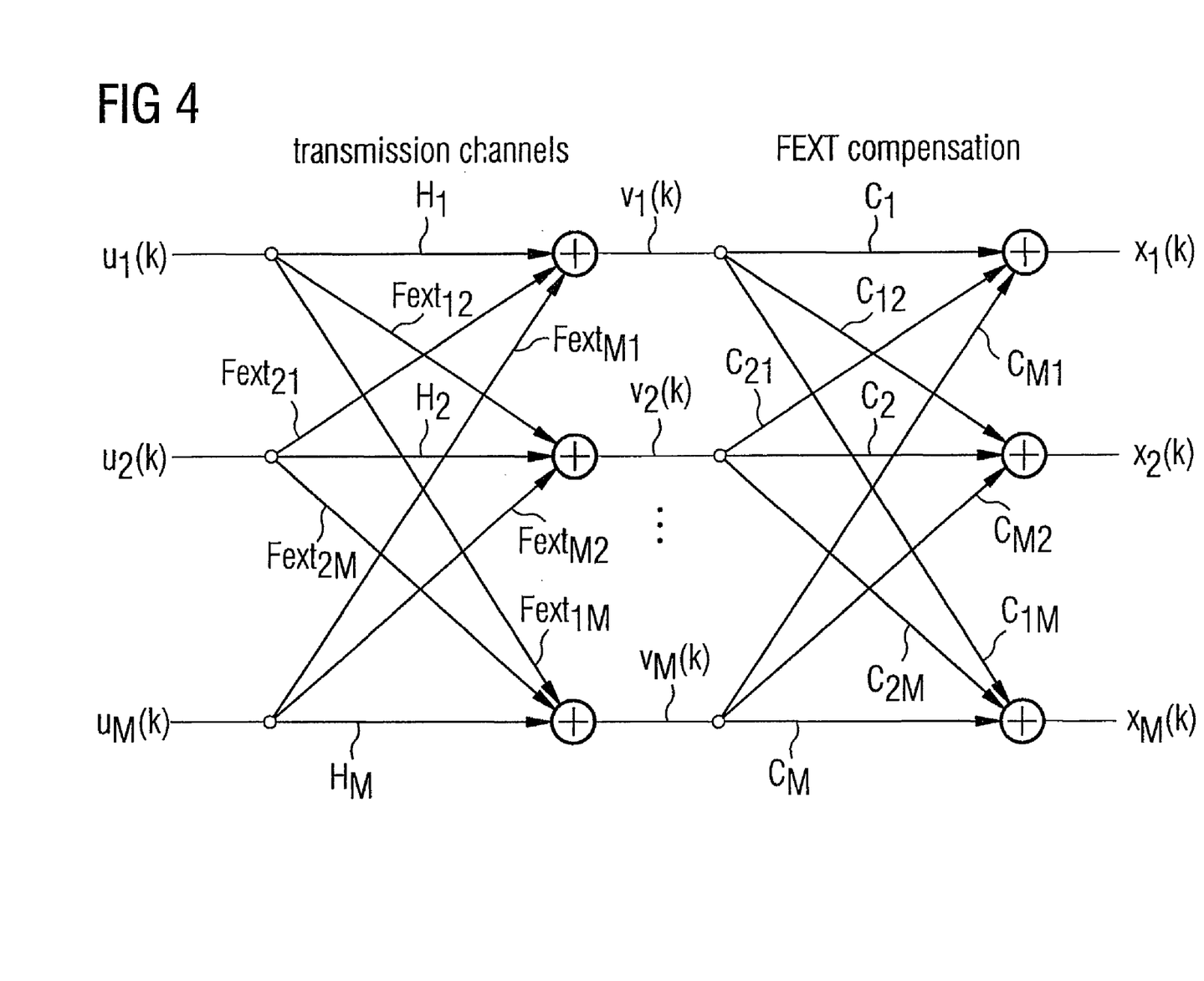
FIG. 4 illustrates a model of FEXT compensation in upstream data transmission.

FIG. 4 shows crosstalk compensation when signals $u_1(k)$ to $u_M(k)$ are transmitted in upstream direction. In this case, the crosstalk compensation is carried out in the central office CO. For this purpose, the vector v containing the signals $v_1(k)$ to $v_M(k)$ received at the output terminals of the transmission lines $L_1$ to $L_M$ is multiplied by a compensation matrix C containing compensation values $C_{ji}$.

Figure 5:
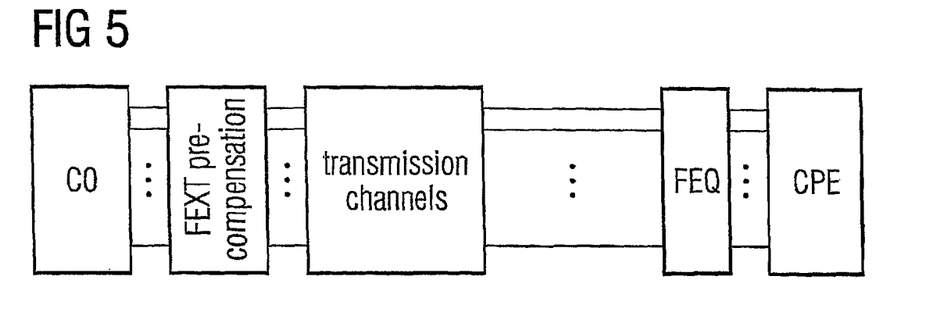
FIG. 5 schematically illustrates FEXT precompensation in downstream direction.

In FIG. 5, FEXT precompensation in downstream direction is summarized. The signals generated at the central office CO are first precompensated and then transmitted over the transmission lines $L_1$ to $L_M$ and received at the customers premises CPE. Signals received at the output terminals of the transmission lines $L_1$ to $L_M$ are fed into frequency equalizers FEQ. The frequency equalizers FEQ multiply the received signals with the inverses $1/H_1$ to $1/H_M$ of the transfer functions $H_1$ to $H_M$, respectively. If the frequency equalizers FEQ are used, the precompensation values $P_1$ to $P_M$ of the direct transmission channels can be set to a fixed value, for example 1.

Figure 6:
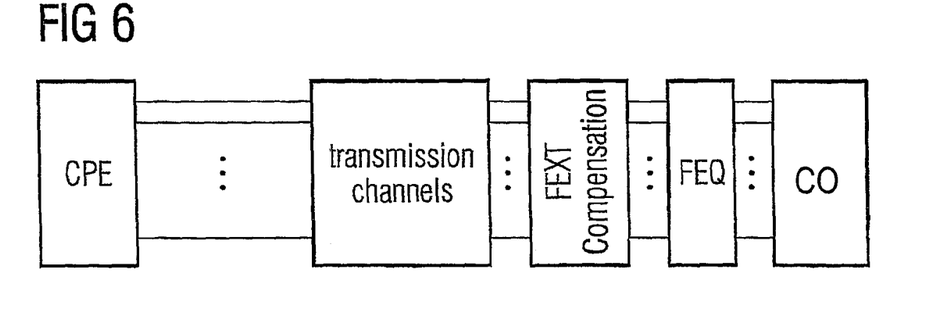
FIG. 6 schematically illustrates FEXT compensation in upstream direction.

In FIG. 6, FEXT compensation in upstream direction is summarized. The signals generated at the customers premises CPE are transmitted over the transmission lines $L_1$ to $L_M$ and are received at the central office CO. At the central office CO, FEXT compensation and frequency equalizing FEQ is carried out. If frequency equalizers FEQ is carried out, the compensation values $C_1$ to $C_M$ of the direct transmission channels can be set to a fixed value, for example 1.

FEXT Channel Selection:

In the embodiment described in the following, a partial crosstalk compensation concept is presented. Instead of compensating all crosstalk channels $Fext_{ji}$ for FEXT, certain crosstalk channels $Fext_{ji}$ are selected and FEXT of only these crosstalk channels $Fext_{ji}$ is compensated or precompensated. While keeping the principle benefits of crosstalk compensation, its complexity can be reduced when performing partial crosstalk compensation. Since the number of crosstalk channels $Fext_{ji}$ selected to be compensated or precompensated can be varied, the partial crosstalk compensation scheme offers a scalable complexity.

Before describing a method for selecting a number of crosstalk channels $Fext_{ji}$ for compensation or precompensation, channel capacities of the transmission lines $L_1$ to $L_M$ are considered. The channel capacity $R_i(k)$ of the transmission line $L_i$ is the number of bits that can be transmitted per frequency channel k and DMT frame. The channel capacity $R_i(k)$ can be written as follows:

$$R_i(k) = \log_2\left(1 + \frac{SNR_i(k)}{\Gamma}\right) \quad (1)$$

Parameter $\Gamma$ is a reference signal-to-noise ratio, which depends on the wanted bit error rate, the margins and the coding gain. $SNR_i(k)$ is the signal-to-noise ratio at the output terminal of the transmission line $L_i$, which is the ratio between the power S of the wanted signal and the power N of the noise. The signal-to-noise ratio $SNR_i(k)$ is given by the following equation:

$$SNR_i(k) = \left(\frac{S}{N}\right)_i = \frac{p_i(k) \cdot |H_i(k)|^2}{\sigma_i(k)^2 + \sum_{j=1, j \neq i}^{M} p_j \cdot |Fext_{ji}(k)|^2} \quad (2)$$

In equation (2), $p_i(k)$ is the power level of the signal $u_i(k)$, and $Y_i(k)$ is the noise variance. Equation (2) may be rewritten as:

$$SNR_i(k) = \frac{p_i(k)}{\frac{\sigma_i(k)^2}{|H_i(k)|^2} + \sum_{j=1, j \neq i}^{M} p_j \cdot \frac{|Fext_{ji}(k)|^2}{|H_i(k)|^2}} \quad (3)$$

According to one embodiment, first values depending on crosstalk among the transmission lines $L_1$ to $L_M$ are provided. For example, the crosstalk transfer functions $Fext_{ji}(k)$ or functions of them such as, for example, the terms $|Fext_{ji}(k)|^2$, may be chosen as first values. The selection of the crosstalk channels to be compensated or precompensated depends on the first values. It is to be noted that crosstalk channels are selected rather than transmission lines. It does not necessarily follows that all crosstalk channels interfering with certain transmission lines are selected. For example, it is possible to select only some of the crosstalk channels interfering with certain transmission lines.

According to a further embodiment, second values specific to the individual transmission lines $L_1$ to $L_M$ are provided. For example, the transfer functions $H_i(k)$ or functions of them such as, for example, the terms $|H_i(k)|^2$, may be chosen as second values. Each transfer function $H_i(k)$ is specific to the corresponding transmission line $L_i$. According to this embodiment, the selection of the crosstalk channels to be compensated or precompensated depends on the first and second values. For example, quotients $$\frac{|Fext_{ji}(k)|^2}{|H_i(k)|^2}$$

of the crosstalk transfer functions $Fext_{ji}(k)$ and the transfer functions $H_i(k)$ may be calculated and the selection of the crosstalk channels to be compensated or precompensated may depend on the quotients $$\frac{|Fext_{ji}(k)|^2}{|H_i(k)|^2}$$

or on functions of them.

For example, the quotients $$\frac{|Fext_{ji}(k)|^2}{|H_i(k)|^2}$$

or functions of them may be listed in a M×M-matrix. Those crosstalk channels $Fext_{ji}$ are selected for compensation or precompensation the corresponding quotients $$\frac{|Fext_{ji}(k)|^2}{|H_i(k)|^2}$$

of which are maximal. According to equation (3), the crosstalk channels corresponding to these quotients provide a major contribution to interference noise. For example, a pre-determined number of crosstalk channels having the greatest quotients $$\frac{|Fext_{ji}(k)|^2}{|H_i(k)|^2}$$

are selected. Before selecting the quotients $$\frac{|Fext_{ji}(k)|^2}{|H_i(k)|^2},$$

they may alternatively be sorted in order of magnitude. If the quotient $$\frac{|Fext_{ji}(k)|^2}{|H_i(k)|^2}$$

is selected, the crosstalk channel from the input terminal of the transmission line $L_j$ to the output terminal of the transmission line $L_i$ is compensated or precompensated for FEXT.

Various methods may be employed to select the crosstalk channels to be compensated or precompensated when the quotients $$\frac{|Fext_{ji}(k)|^2}{|H_i(k)|^2}$$

are listed in a matrix or are sorted in order of magnitude. For example, it may be provided that those crosstalk channels are selected, the corresponding quotients $$\frac{|Fext_{ji}(k)|^2}{|H_i(k)|^2}$$

of which are greater than a pre-determined threshold value. Alternatively, for example, a pre-determined number of FEXT channels having the greatest quotients $$\frac{|Fext_{ji}(k)|^2}{|H_i(k)|^2}$$

are selected.

It may be provided that the selection of crosstalk channels is carried out such that the bit rates of the longer transmission lines are increased at the cost of reducing the bit rates of the shorter transmission lines. This technique provides relatively high bit rates to all subscribers.

According to a further embodiment, each of the quotients $$\frac{|Fext_{ji}(k)|^2}{|H_i(k)|^2}$$

may be multiplied with a factor $\alpha_i$ before listed in the square matrix or before sorted in order of magnitude. The factor $\alpha_i$ depends on the transmission line $L_i$ and may, for example, be in the range between 0 and 1. For example, if the factor $\alpha_i$ of the transmission line $L_i$ is small, this may indicate that the subscriber i requires a lower bit rate or subscribed a lower bit rate.

According to a further embodiment, crosstalk channel selection and crosstalk compensation or precompensation of the selected crosstalk channels may be carried out for all frequency channels k or for selected frequency channels k. For example, only frequency channels k having low carrier frequencies may be selected for compensation or precompensation.

For crosstalk compensation and precompensation various methods are known in the art. In the present embodiment, FEXT compensation or precompensation of the selected crosstalk channels may be carried out by using any of the methods known to a person skilled in the art.

Determination of Crosstalk Transfer Functions

In the following, a method is presented for determining the crosstalk transfer functions $Fext_{ji}(k)$. The direct transfer functions $H_i$ may be determined by using a common method known to a person skilled in the art. The transfer functions $Fext_{ji}(k)$ and $H_i(k)$ may be used to calculate the quotients $$\frac{|Fext_{ji}(k)|^2}{|H_i(k)|^2}.$$

In case there is no interference between different frequency channels, such as in DMT transmission systems, the crosstalk transfer functions $Fext_{ji}(k)$ may be determined separately for each frequency channel. In the following the method for determining the crosstalk transfer functions $Fext_{ji}(k)$ is therefore described for only one frequency channel k, but may be applied to other frequency channels as well.

Figure 7:
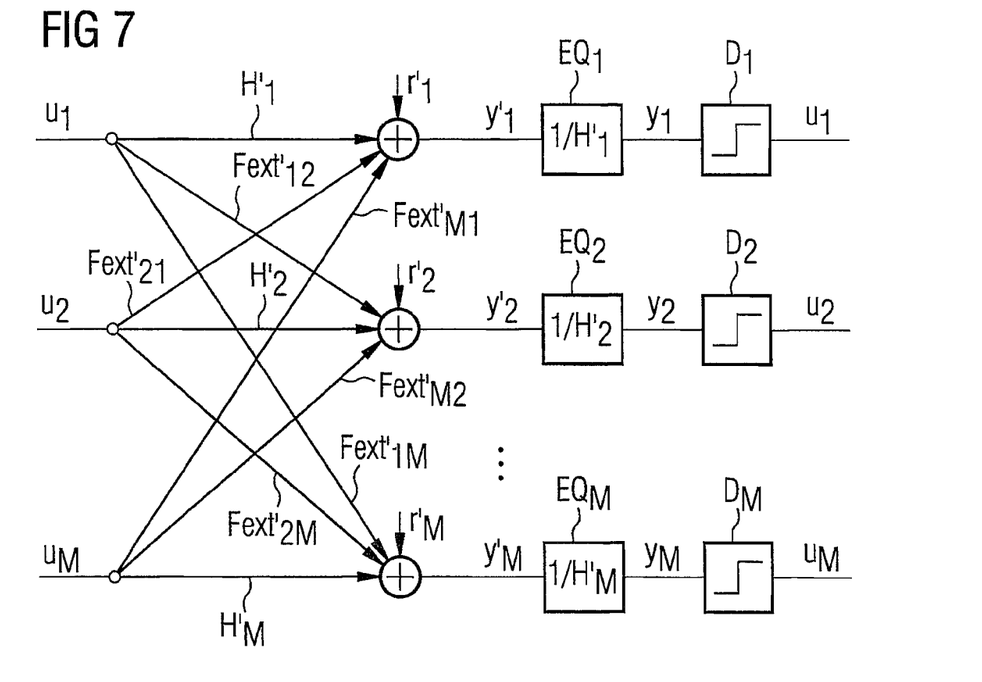
FIG. 7 illustrates a further interference channel model showing crosstalk interference among the transmission lines $L_1$ to $L_M$.
Figure 8:
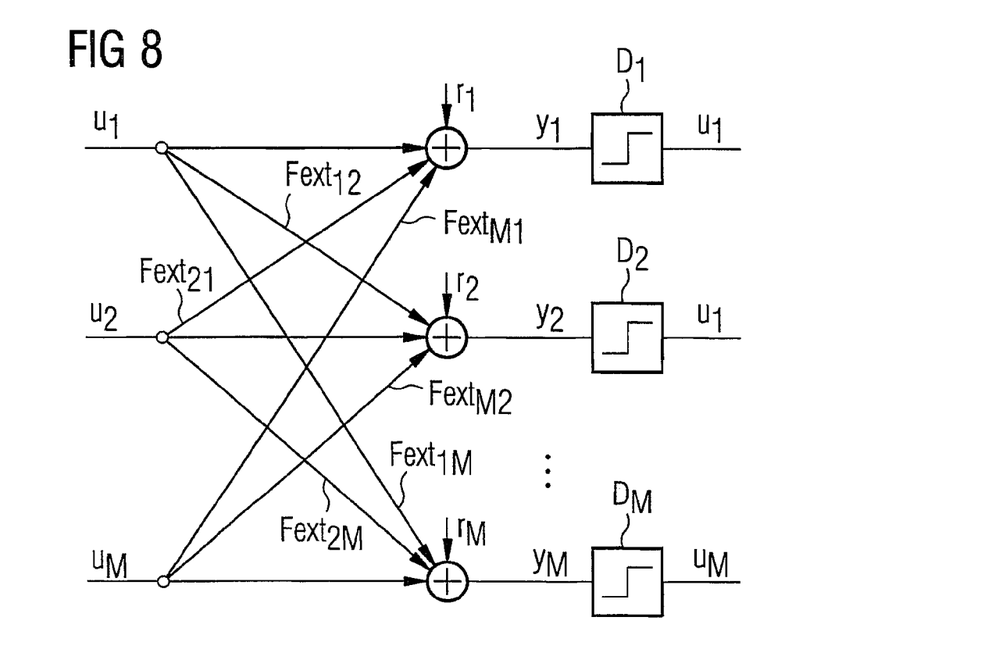
FIG. 8 illustrates yet a further interference channel model showing crosstalk interference among the transmission lines $L_1$ to $L_M$.

The interference channel model shown in FIG. 2 may be extended by adding interfering signals $r_i$ caused by alien noise as well as equalizers $EQ_1$ to $EQ_M$ and deciders $D_1$ to $D_M$ as illustrated in FIG. 7. The equalizers $EQ_1$ to $EQ_M$ multiply the received signals with the inverses $1/H'_1$ to $1/H'_M$ of the direct transfer functions $H'_1$ to $H'_M$, respectively. The interference channel model of FIG. 7 may be rearranged by integrating the equalizers $EQ_1$ to $EQ_M$ into the transfer functions $H'_i$ and $Fext'_{ji}$, which results in an interference channel model as shown in FIG. 8. In this interference channel model all direct transfer functions $H_i$ are 1. Further, the power of the interfering signals r caused by alien noise needs to be weighted:

$$\langle r_i^2(k) \rangle = \frac{1}{|H_i(k)|} \cdot \langle r_i'^2(k) \rangle \tag{4}$$

According to the interference channel model shown in FIG. 8, the signal $y_i$ received at the output terminal of the transmission line $L_i$ is as follows:

$$y_i(k) = u_i(k) + \sum_{j=1, j\neq i}^{M} u_j(k) \cdot Fext_{ji}(k) + r_i(k) \tag{5}$$

In equation (5) the signals $u_1(k)$ to $u_M(k)$ are the output signals of the deciders $D_1$ to $D_M$, respectively.

For the determination of the crosstalk transfer functions $Fext_{ji}$ a linear system of equations can be established. For i=1 the following equation is obtained:

$$\begin{bmatrix} y_1(1)-u_1(1) \\ y_1(2)-u_1(2) \\ M \\ y_1(L)-u_1(L) \end{bmatrix} \begin{bmatrix} u_2(1) & u_3(1) & \Lambda & u_M(1) \\ u_2(2) & u_3(2) & \Lambda & u_M(2) \\ M & M & & M \\ u_2(L) & u_3(L) & \Lambda & u_M(L) \end{bmatrix} \cdot \begin{bmatrix} H_{21} \\ H_{31} \\ M \\ H_{M1} \end{bmatrix} \tag{6}$$

In equation (6) l=1, . . . , L denotes the FFT (fast Fourier transformation) frame. L symbols are transmitted over each of the transmission lines $L_1$ to $L_M$. Equation (6) may be rewritten as:

$$\Delta y_1 = U_1 \cdot H_1 \tag{7}$$

This system of linear equations may be solved by using a least mean square algorithm:

$$H_1 = (U_1^{*T} \cdot U_1)^{-1} \cdot (U_1^{*T} \cdot \Delta y_1) = Q^{-1} \cdot b \tag{8}$$

$$Q = (U_1^{*T} \cdot U_1) \tag{9}$$

$$b = U_1^{*T} \cdot \Delta y_1 \tag{10}$$

In equation (8) $U_1^{*T}$ denotes the complex conjugated transpose of the matrix $U_1$. For calculating the matrix $H_1$ the square matrix Q is inverted and multiplied by the vector b.

The elements $q_{v\mu}$ of the matrix Q and $b_v$ of the vector b have the form:

$$q_{v\mu} = \sum_{k=1}^{L} U_{v+1}^*(k) \cdot U_{\mu+1}(k) \tag{11}$$

$$b_v = \sum_{k=1}^{L} U_{v+1}^*(k) \cdot \Delta y_1(k) \tag{12}$$

The elements $q_{v\mu}$ and $b_v$ may be calculated recursively, but may also be calculated as follows:

$$q_{v\mu}(1) = U_{v+1}^*(1) \cdot U_{\mu+1}(1) \tag{13}$$

$$q_{v\mu}(\lambda) = q_{v\mu}(\lambda-1) + U_{v+1}^*(\lambda) U_{\mu+1}(\lambda) \tag{14}$$

for $\lambda=2, 3, \ldots, L$ and $v, \mu=1, 2, \ldots, M-1$ $$b_v(1) = U_{v+1}^*(1) \cdot \Delta y_1(1) \tag{15}$$

$$b_v(\lambda) = b_v(\lambda-1) + U_{v+1}^*(\lambda) \Delta y_1(\lambda) \tag{16}$$

for $\lambda=2, 3, \ldots, L$ and $v, \mu 1, 2, \ldots, M-1$

Figure 9:
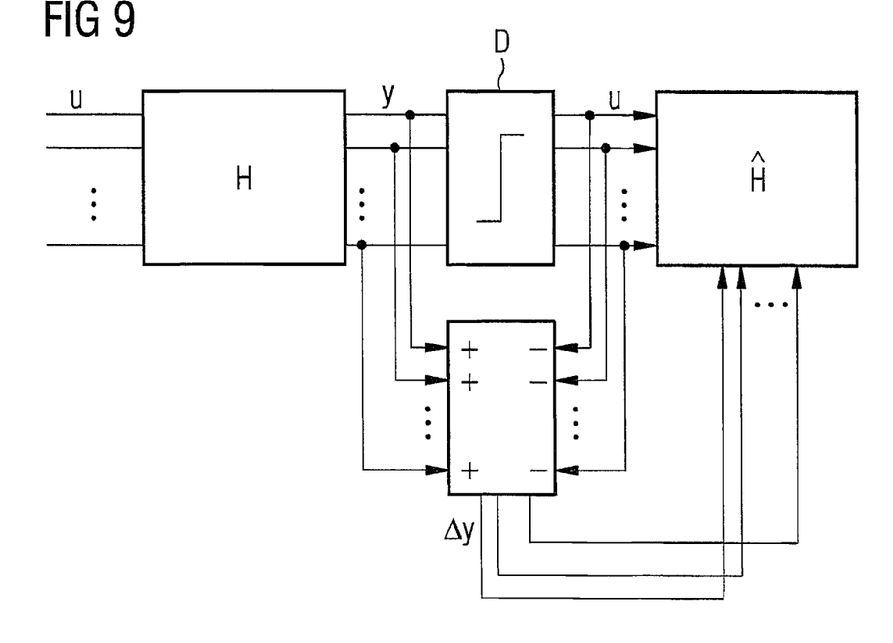
FIG. 9 schematically illustrates the determination of a transmission matrix $\hat{H}$.

During a test interval, the M−1 elements of the first column of a transmission matrix $\hat{H}$ comprising the crosstalk transfer functions $Fext_{ji}$ can be calculated as described above. The other columns of the matrix $\hat{H}$ are calculated accordingly. FIG. 9 schematically illustrates the determination of the matrix $\hat{H}$. Signals u are simultaneously transmitted over the transmission lines $L_1$ to $L_M$ where they are subject to crosstalk interference which is expressed by the matrix H. Signals y are received at the output terminals of the transmission lines $L_1$ to $L_M$ by the transceivers $RT_1$ to $RT_M$. The signals y are provided to a decider D. The decider D estimates which signal $u_i$ is closest to the signal $y_i$ and outputs the difference between the signals $y_i$ and $u_i$ as an error signal $\Delta y_i$. Alternatively, the signal $u_i$ may be known at the transceiver $RT_i$ and the error signal $\Delta y_i$ may then be the difference between the signal $y_i$ and the signal $u_i$ known at the transceiver $RT_i$. The vector $\Delta y$ containing the error signals $\Delta y_i$ as well as the vector u are used to calculate the elements of the matrix $\hat{H}$.

Figure 10:
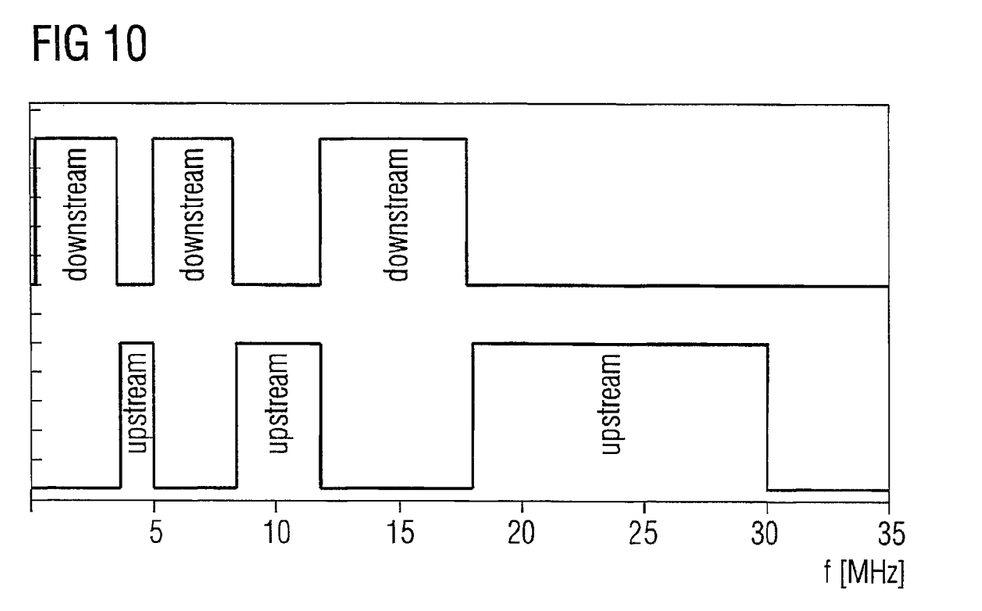
FIG. 10 illustrates frequency band allocation of an exemplary VDSL2 network.

Simulation Results:

In the following, simulations are presented which illustrate the methods described above. The simulated network is a VDSL2 network having a frequency range up to 30 MHz and a frequency band allocation as shown in FIG. 10. Different frequency bands are used for data transmission in upstream direction and downstream direction. According to the standard VDSL2, 4096 frequency samples are used at the transmitter and the receiver for a discrete Fourier transformation, wherein the carrier frequencies within the frequency bands shown in FIG. 10 are used for data transmission. The maximum transmit power density of each of the transmission lines is −56.5 dBm/Hz.

The simulated network includes 20 transmission lines $L_1$ to $L_{20}$. The lengths of the transmission lines $L_1$ to $L_{20}$ are evenly distributed between 150 m and 300 m. An additional noise signal having a spectral power density of 120 dBm/Hz is added at the receiver's end in order to simulate alien noise.

Figure 11:
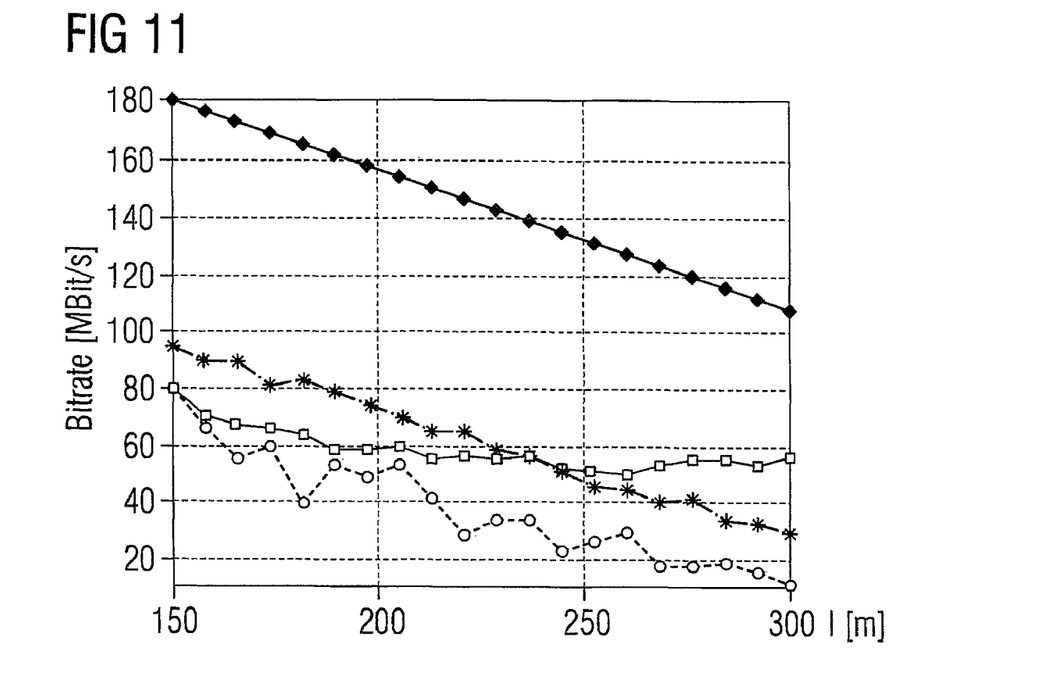
FIG. 11 illustrates exemplary simulation results of an upstream data transmission.

FIG. 11 shows the results of the simulations carried out for data transmission in upstream direction (from the transceivers $RT_1$ to $RT_{20}$ to the central office CO). The parameter Γ was set to 11 dB. In FIG. 11 the simulated bit rates of the transmission lines $L_1$ to $L_{20}$ are shown for four cases. Data illustrated by circles were recorded without any crosstalk compensation. Data illustrated by dots were recorded using full crosstalk compensation meaning all crosstalk channels, i.e., 20×19=380 FEXT channels, were compensated for all frequency channels. Data illustrated by asterisks were recorded using partial crosstalk compensation, wherein 20×4=80 crosstalk channels for each frequency channel were compensated and for the compensation only those crosstalk channels were selected having the highest term $Fext_{ji}(k)$. Data illustrated by squares were recorded using partial crosstalk compensation, wherein 20×4=80 crosstalk channels for each frequency channel were compensated and for the compensation only those crosstalk channels were selected having the highest quotients $$\frac{|Fext_{ji}(k)|^2}{|H_i(k)|^2}.$$

Table 1 shows the lowest and highest bit rates for the four cases of the simulated network in upstream direction.

TABLE 1

| Upstream direction | lowest bit rate | highest bit rate |
|---|---|---|
| without crosstalk compensation | 11 MBit/s | 78.5 MBit/s |
| full crosstalk compensation | 105 MBit/s | 181 MBit/s |
| partial crosstalk compensation, channel selection according to the term $Fext_{ji}(k)$ | 28.5 MBit/s | 94.8 MBit/s |
| partial crosstalk compensation, channel selection according to the quotient $\frac{|Fext_{ji}(k)|^2}{|H_i(k)|^2}$ | 48.5 MBit/s | 77.2 MBit/s |

It can be seen from FIG. 11 and Table 1 that if the selection of the crosstalk channels to be compensated depends on the quotients $$\frac{|Fext_{ji}(k)|^2}{|H_i(k)|^2},$$

the bit rates of the longer transmission lines are increased at the cost of reducing the bit rates of the shorter transmission lines compared to the case where the selection of the crosstalk channels to be compensated only depend on the term $Fext_{ji}(k)$. By increasing the bit rates of the longer transmission lines at cost of reducing the bit rates of the shorter transmission lines it is possible to provide relatively high bit rates to all subscribers.

Figure 12:
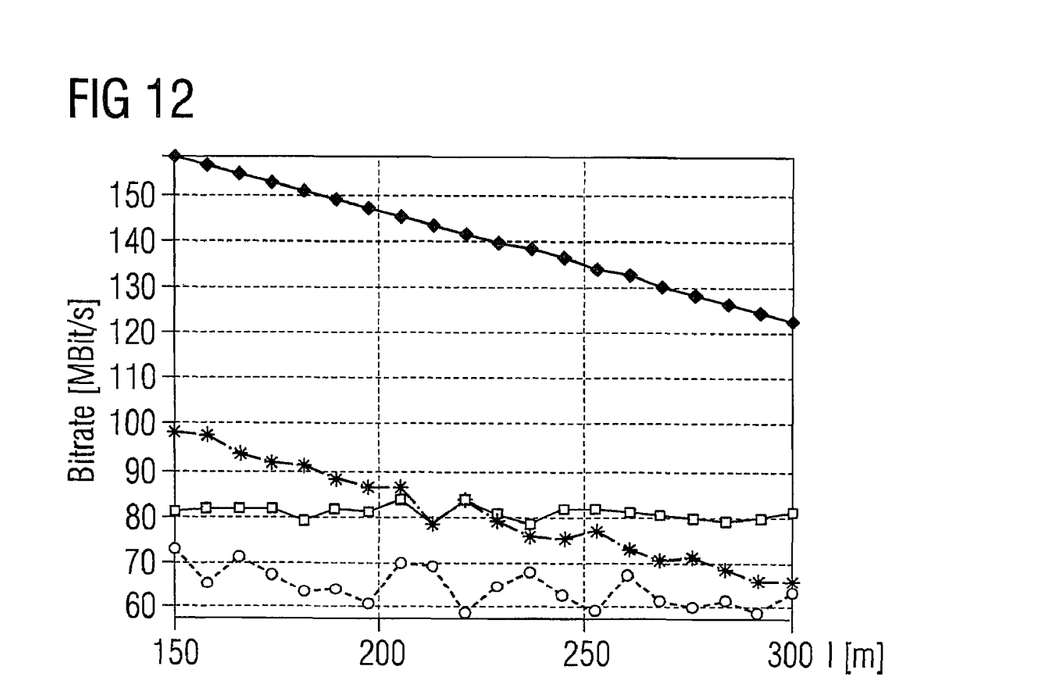
FIG. 12 illustrates exemplary simulation results of a downstream data transmission.

FIG. 12 shows the results of the simulations carried out for data transmission in downstream direction (from the central office CO to the transceivers $RT_1$ to $RT_{20}$). In FIG. 12 the simulated bit rates of the transmission lines $L_1$ to $L_{20}$ are shown for the same four cases as in FIG. 11. Table 2 shows the lowest and highest bit rates for the four cases of the simulated network in downstream direction.

TABLE 2

| Downstream direction | lowest bit rate | highest bit rate |
|---|---|---|
| without crosstalk compensation | 58.2 MBit/s | 72.9 MBit/s |
| full crosstalk compensation | 123.8 MBit/s | 158.0 MBit/s |
| partial crosstalk compensation, channel selection according to the term $Fext_{ji}(k)$ | 66.2 MBit/s | 98.0 MBit/s |
| partial crosstalk compensation, channel selection according to the quotient $\frac{|Fext_{ji}(k)|^2}{|H_i(k)|^2}$ | 78.4 MBit/s | 84.3 MBit/s |

It can be seen from FIG. 12 and Table 2 that when the selection of the crosstalk channels to be compensated depends on the quotients $$\frac{|Fext_{ji}(k)|^2}{|H_i(k)|^2}$$

the bit rates of the longer transmission lines in downstream direction are also increased at the cost of reducing the bit rates of the shorter transmission lines compared to the case where the selection of the crosstalk channels to be compensated only depend on the term $Fext_{ji}(k)$.

While in the above exemplary embodiments have been described, it is to be understood that many modifications of these embodiments may be provided. For example, the transmission lines $L_1$ to $L_M$ may be replaced by wireless transmission links. Therefore, when reference is made to transmission lines, the transmission lines may be replaced by wireless transmission links.

The above exemplary systems may provide an xDSL system as well as a system of other services for transmitting data over the transmission lines $L_1$ to $L_M$. In addition, while the transmission system may use different frequency bands for downstream and upstream transmission, it may also use a same frequency band for both, downstream and upstream transmission. The above described embodiments are equally applicable to systems using timeslots for transmission.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may have been used. It should be understood that these terms may have been used to indicate that two elements co-operate or interact with each other regardless of whether they are in direct physical or electrical contact, or they are not in direct contact with each other. Furthermore, it should be understood that embodiments of the invention may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

What is claimed is:

1. A method comprising:
providing first values depending on crosstalk among a plurality of transmission links, each first value corresponding to one of a plurality of crosstalk channels, wherein each crosstalk channel represents a signal transfer from one of the plurality of the transmission links to a different one of the plurality of transmission links;
providing second values specific to the plurality of transmission links;
selecting a number of crosstalk channels from the plurality of crosstalk channels, wherein the selecting depends on a plurality of quotients, and wherein each quotient depends on one first value of the first values and one second value of the second values; and
compensating for crosstalk based on the selected crosstalk channels.

2. The method of claim 1, wherein crosstalk compensation parameters are determined by using the selected crosstalk channels.

3. The method of claim 1, wherein crosstalk precompensation parameters are determined by using the selected crosstalk channels.

4. The method of claim 1, wherein the quotients are sorted in order of magnitude.

5. The method of claim 1, wherein the crosstalk channels are selected corresponding to the quotients having the highest values.

6. The method of claim 1, wherein the crosstalk channels are selected corresponding to the quotients exceeding a pre-determined threshold value.

7. The method of claim 1, wherein a pre-determined number of the crosstalk channels are selected corresponding to the quotients having the highest values.

8. The method of claim 1, wherein each of the second values corresponds to one of the transmission links and each of the second values depends on attenuation of the corresponding transmission link.

9. The method of claim 1, wherein each of the first values corresponds to one of the crosstalk channels and each of the first values depends on a crosstalk transfer function of the corresponding crosstalk channel.

10. The method of claim 1, wherein the method is repeated for several transmission frequencies.

11. The method of claim 1, wherein crosstalk compensation or precompensation parameters are determined by using the selected crosstalk channels, the crosstalk compensation or precompensation parameters being used to mitigate effects of Frontend crosstalk.

12. The method of claim 1, further comprising compensating the effect of crosstalk only on the selected number of crosstalk channels.

13. The method of claim 12, wherein compensating the effect of crosstalk comprises performing precompensation, and wherein crosstalk precompensation parameters are determined by using the selected crosstalk channels.

14. The method of claim 1, wherein the plurality of transmission links comprise wired transmission links.

15. The method of claim 1, wherein each of the quotients is multiplied with a corresponding weighting factor that depends on a corresponding transmission link.

16. A computer running software for executing a method, the method comprising:
providing first values depending on crosstalk among a plurality of transmission links, each first value corresponding to one of a plurality of crosstalk channels, wherein each crosstalk channel represents signal transfer from one of the plurality of transmission links to a different one of the plurality of transmission links;
providing second values specific to the plurality of transmission links;
selecting a number of crosstalk channels from a plurality of crosstalk channels, wherein the selecting depends on a plurality of quotients, and wherein each quotient depends on one first value of the first values and on one second value of the second values; and
compensating for crosstalk based on the selected crosstalk channels.

17. A device, comprising:
a first determination circuit configured to determine first values depending on crosstalk among a plurality of transmission links;
a second determination circuit configured to determine second values specific to the plurality of the transmission links; and
a selection circuit configured to select a number of crosstalk channels from a plurality of crosstalk channels, wherein each crosstalk channel represents signal transfer from one of the plurality of the transmission links to a different one of the plurality of transmission links, wherein the selection circuit is configured to select the number of crosstalk channels depending on quotients, and wherein each quotient depends on one first value of the first values and on one second value of the second values.

18. The device of claim 17, further comprising a crosstalk compensation circuit configured to only compensate crosstalk over the selected crosstalk channels.

19. The device of claim 17, further comprising a crosstalk precompensation circuit configured to only precompensate crosstalk over the selected crosstalk channels.

20. The device of claim 17, wherein the selection circuit selects those crosstalk channels corresponding to the quotients having the highest values.

21. The device of claim 17, wherein each of the second values corresponds to one of the transmission links and each of the second values depends on attenuation of the corresponding transmission link.

22. The device of claim 17, wherein each of the first values corresponds to one of the crosstalk channels and each of the first values depends on a crosstalk transfer function of the corresponding crosstalk channel.

23. The device of claim 18, wherein the crosstalk compensation circuit mitigates effects of Frontend crosstalk.

24. The device of claim 19, wherein the crosstalk precompensation circuit mitigates effects of Frontend crosstalk.

25. The device of claim 17, wherein each of the quotients is multiplied with a corresponding weighting factor that depends on a corresponding transmission link.

26. A method comprising:
providing a crosstalk transfer function ($Fext_{ji}(k)$) depending on crosstalk from an $i^{th}$ transmission link of the plurality of transmission links to a $j^{th}$ transmission link of the plurality of transmission links;
providing a transfer function ($H_i(k)$) of the $i^{th}$ transmission link;
selecting a number of crosstalk channels from a plurality of crosstalk channels, wherein selecting the number of crosstalk channels comprises selecting the number of crosstalk channels according to the expression $$\frac{|Fext_{ji}(k)|^2}{|H_i(k)|^2};$$

and
compensating for crosstalk based on the selected crosstalk channels.

27. The method of claim 26, wherein selecting the number of crosstalk channels comprises selecting the number of crosstalk channels according to when the expression $$\frac{|Fext_{ji}(k)|^2}{|H_i(k)|^2}$$

exceeds a predetermined threshold.

28. A device comprising:
a first determination circuit configured to determine a crosstalk transfer function ($Fext_{ji}(k)$) depending on crosstalk between an $i^{th}$ transmission link of the plurality of transmission links to a $j^{th}$ transmission link of the plurality of transmission links;
a second determination circuit configured to determine a transfer function ($H_j(k)$) of the $i^{th}$ transmission link; and
a selection circuit configured to select a number of crosstalk channels from a plurality of crosstalk channels, wherein each crosstalk channel is determined according to the expression $$\frac{|Fext_{ji}(k)|^2}{|H_i(k)|^2}.$$

29. The device of claim 28, wherein the selection circuit is configured to select the number of crosstalk channels according to when the expression $$\frac{|Fext_{ji}(k)|^2}{|H_i(k)|^2}$$

exceeds a predetermined threshold.

\* \* \* \* \*